Oct. 21, 1958     R. C. DEEGAN     2,857,126

WEIGHING CONTROL

Filed Nov. 23, 1956

INVENTOR.

RICHARD C. DEEGAN

BY

Beau, Brooks, Buckley & Beau
ATTORNEYS

United States Patent Office 2,857,126
Patented Oct. 21, 1958

2,857,126

WEIGHING CONTROL

Richard C. Deegan, Buffalo, N. Y., assignor to Bell Aircraft Corporation, Wheatfield, N. Y.

Application November 23, 1956, Serial No. 624,083

5 Claims. (Cl. 249—2)

This invention relates to weighing devices, and more particularly to weight-control mechanisms applicable for example to the problem of precisely controlling the loaded weights of packaged goods, or to other similar problems.

A principal object of the present invention is to provide a precisely operating weight transducer operable in the manner of a balance mechanism and providing an output signal or pulse for control of the associated load regulating mechanism.

Another object of the invention is to provide a transducer as aforesaid which is wholly independent of external power requirements; and which employs no pivots or mechanical levers, and is completely friction-free.

Another object of the invention is to provide a transducer as aforesaid which is inherently explosion-proof and also fully operable for example in acid or other corrosive atmospheres.

Still another object of the invention is to provide an improved transducer as aforesaid which may be readily adjusted to provide an anticipation signal or control pulse just prior to completion of a weighing operation; whereby the package filling operation may be performed in multiple stages at progressively reduced rates to obtain maximum overall speed of filling coincident with a precise final weight control.

Other objects and advantages of the invention will appear in the specification hereinafter.

Figure 2:
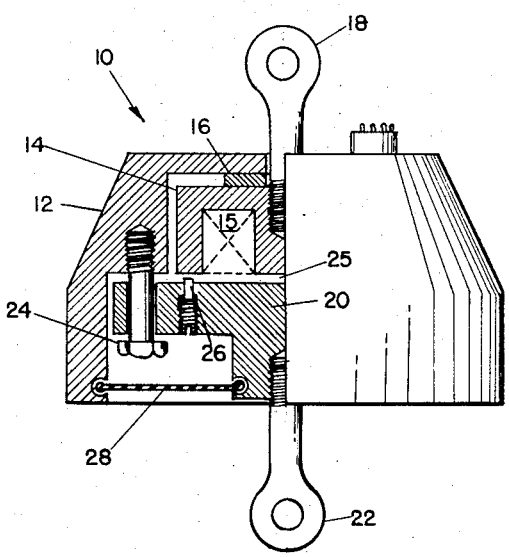
Fig. 2 is an enlarged semi-elevational and semi-sectional view of the transducer device of Fig. 1.
Figure 1:
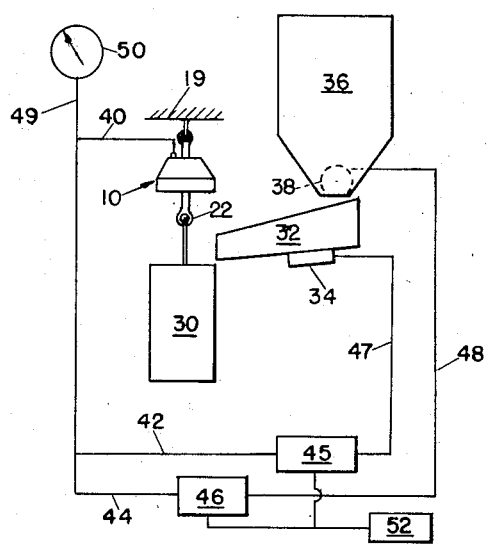
Fig. 1 is a diagrammatic illustration of a batch weighing operation embodying an improved transducer device of the present invention.

As illustrated in Fig. 1 of the drawing herewith, a transducer device of the invention may be constructed as indicated generally at 10; and as shown in detail in Fig. 2 the transducer 10 comprises generally a housing 12 enclosing a permanent magnet 14 which is circularly recessed and fitted therein with a pick-up coil 15. The magnet 14 is insulated from the housing 12 by means of an insulated collar 16, and a screweye 18 is mounted in the magnet core 14 for suspension of the transducer from any suitable fixed structure such as indicated at 19 (Fig. 1).

Also enclosed within the housing 12 is a circular supporter plate 20 which carries a second screweye 22 for suspension therefrom of the load to be weighed. The plate 20 is provided at diametrically opposed positions adjacent its periphery with apertures through which extend headed machine screws 24 which hold the plate in assembly but in vertically spaced relation from the magnet core 14 to provide an air gap therebetween as indicated at 25. Up-stops 26 extend at diametrically opposed positions between the magnet core 14 and the plate 20 so as to maintain a predtermined width of air gap therebetween under unloaded conditions. A dust seal ring as indicated at 28 is provided to enclose the otherwise open bottom end of the housing 12, as shown in Fig. 1.

Thus, it will be appreciated that the transducer unit may be readily mounted in a weighing system as illustrated in Fig. 1, by simply hanging the suspension hook 18 upon a fixed bracket 19, and then suspending from the bottom hook 22 a container 30 holding the load to be weighed. The permanent magnet 14 is so selected and arranged as to be adapted to hold the plate 20 and the load container 30 until such time as the prescribed weight is placed in the container 30. It is well known that the attractive force developed by a magnet acting through a fixed air gap is directly proportional to the magnet strength and inversely proportional to the square of the air gap measurement. Thus, when the load weight exceeds the magnet attractive force by the smallest fraction, this force is overcome and the load falls. Due to the presence of the pickup coil 15 within the magnetic flux field created by the magnet 14, whenever the armature plate 20 moves relative to the magnet 14, the reluctance in the pickup coil changes and a detectable electrical impulse flows through the coil. Thus at the very instant the load overbalances the magnet force an electrical signal or impulse flows through the coil to be usefully applied as will be explained hereinafter.

Thus for example as shown in Fig. 1, the device of the invention may be employed in an arrangement to control the batch loading of a container such as indicated at 30. In this illustration the container 30 may represent a package to be filled with some loose or flowable material, for example, such as may be fed to the container 30 by means of material feeder means operated by feeder motor means, these means, for example, including an inclined feeder 32 energized by an electric vibrator as indicated at 34; the feeder 32 being in turn supplied from a hopper 36 having a discharge control gate which may be motor-driven as indicated at 38. The leads from the coil 15 are illustrated in Fig. 1 in single line form as indicated at 40 and connect to motor control means including circuits 42, 44 controlling relays 45 and 46 respectively. In turn the relays 45, 46 control the flow of power from a power supply 52 to circuits 47, 48 connected to the feed vibrator 34 and the hopper gate motor 38, respectively.

A shunt circuit 49 from the lead circuit 40 may be arranged to extend to a dial indicator 50 furnishing visual readings of the weight of the load carried by the transducer 10. Thus, for example as shown in Fig. 1, the transducer 10 may be so arranged that whenever the load within the container 30 reaches the prescribed weight, the armature plate 20 of the transducer will fall away from the transducer magnet 14, thereby energizing the pickup coil 15 and the circuitry connected thereto. Thus, the relays 45, 46 are energized to in turn cause the vibrator and hopper gate motor to stop; thereby halting the container filling operation.

Figure 3:
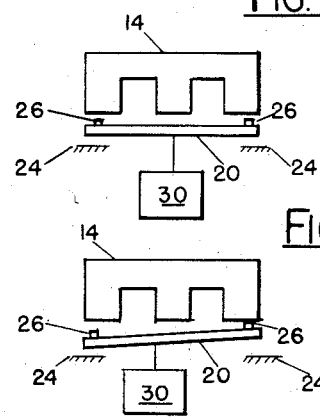
Fig. 3 is a schematic illustration of the condition of the transducer major components prior to application of a balanced load thereon.
Figure 4:
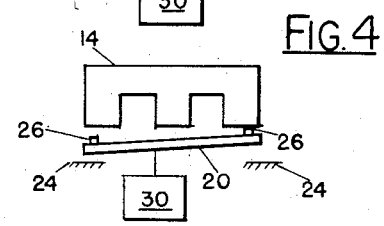
Fig. 4 is a view corresponding to Fig. 3, but illustrating the relative positions of the transducer major components when an "anticipation" signal is being generated.

Fig. 3 illustrates diagrammatically the functioning of the device when arranged for single phase operation. Fig. 4 illustrates schematically the arrangement and operation of the device when arranged to provide an initial "anticipation" signal or pulse control effect prior to entire stoppage of the container loading operation. In this case the load 30 is connected to the armature plate eccentrically of the center of the attractive force of the magnet 14; or, as an alternative arrangement, the magnet 14 may be so constructed and arranged to produce a magnetic flux field having its center of attractive force located at a position offset from the center of the plate 20. In either case, it will be appreciated that as the load in the container 30 approaches the prescribed weight, the pull of the load downwardly upon the plate 20 is unbalanced and tends to first pull the plate away from the magnet at one side of the device.

Thus, the load operates eventually to draw one edge of the plate 20 away from the magnet and against the down stop prior to movement of the opposite edge of the plate, as illustrated in Fig. 4; and as a result of this partial drop of the plate 20 an initial or "anticipation" signal or pulse is induced in the coil 15 and is transmitted through the circuitry to the feed control mechanism of the system. Then, as the load in the container 30 reaches the prescribed final weight for the package, the opposite edge of the plate 20 "lets go" from the magnet and a further signal is thereby generated in the coil and transmitted by the circuit to the feed controls.

Hence, it will be appreciated that the control system may be readily so arranged that as the initial or "anticipation" signal flows through the control circuitry the material feeding apparatus may be partially deenergized or slowed down or throttled back, as may be preferred; so as to thereupon permit further "finishing" of the loading operation at a reduced rate. Then, upon attainment of the final prescribed weight for the package being loaded, the second signal or pulse is transmitted to the control circuitry and will operate to completely stop the feeding operation. Thus, by this method an initial relatively rapid rate of feeding may be safely employed, while just prior to filling of the container the feed rate is drastically reduced for final "finishing" in accurately measured manner; thereby providing an overall improved feeding and load weighing operation.

It will of course be understood that although only one form of the invention has been illustrated and described in detail, it will be apparent to those skilled in the art that the invention is not so limited but that various changes may be made therein without departing from the spirit of the invention or the scope of the appended claims.

I claim:

1. A material loading system including a container to be loaded to a predetermined weight, a material feeder operable to deliver material to said container, motor means controlling operation of said feeder, a weighing device comprising an electromagnet suspended on a fixed bracket, a lift plate mounted in opposition to said magnet and retained in relation thereto by lost-motion holding means providing at all times between said magnet and said lift plate an air-gap which is variable in width, said container being suspended from said lift plate, a power supply, control means interposed between said power supply and said motor means, and a pick-up coil disposed within the flux field of said magnet and coupled to said control means whereby movement of said lift plate relative to said magnet will induce control of power to said motor means.

2. A material loading system including a container to be loaded to a predetermined weight, a material feeder operable to deliver material to said container, motor means controlling operation of said feeder, a weighing device comprising an electromagnet suspended on a fixed bracket, a lift plate mounted in opposition to said magnet and retained in relation thereto by lost-motion holding means providing at all times between said magnet and said lift plate an air-gap which is variable in width, said container being suspended from said lift plate, a power supply, control means interposed between said power supply and said motor means, and a pick-up coil disposed within the flux field of said magnet and coupled to said control means whereby release of said lift plate by said magnet upon attainment of a predetermined weight of said container will induce a current change in said coil and actuate said control means to halt operation of said motor means.

3. A material loading system including a container to be loaded to a predetermined weight, a material feeder operable to deliver material to said container, motor means controlling operation of said feeder, a weighing device comprising a permanent magnet suspended on a fixed bracket, a lift plate mounted in opposition to said magnet, said container being suspended from said lift plate, a power supply, control means interposed between said power supply and said motor means, and a pick-up coil disposed within the flux field of said magnet and coupled to said control means whereby movement of said lift plate relative to said magnet will induce control of said motor means.

4. A material loading system including a container to be loaded to a predetermined weight, a material feeder operable to deliver material to said container, motor means controlling operation of said feeder, a weighing device comprising a permanent magnet suspended on a fixed bracket, a lift plate mounted in opposition to said magnet and retained in relation thereto by lost-motion holding means providing at all times between said magnet and said lift plate an air-gap which is variable in width, said container being suspended from said lift plate and said magnet and lift plate being arranged so as to provide an unbalanced load upon said lift plate tending to pull it away from said magnet with stronger force at one side thereof than at its diametrically opposite side, a power supply, control means interposed between said power supply and said motor means, and a pick-up coil disposed within the flux field of said magnet and coupled to said control means whereby release of said lift plate by said magnet upon attainment of a predetermined weight of said container will induce a current change in said coil and actuate said control means to halt operation of said motor means.

5. A material loading system including a container to be loaded to a predetermined weight, a material feeder operable to deliver material to said container, variably operable motor means controlling operation of said feeder, a weighing device comprising a permanent magnet suspended on a fixed bracket, a lift plate mounted in opposition to said magnet and retained in relation thereto by lost-motion holding means providing between said magnet and said lift plate an air-gap which is variable in width, said container being suspended from said lift plate and so arranged that the lift plate tends to pull away from the magnet, under load, first at one side of said lift plate and later at the other side thereof, a power supply, control means interposed between said power supply and said motor means, and a pick-up coil disposed within the flux field of said magnet and coupled to said control means whereby first movement of said lift plate at one side relative to said magnet will induce an "anticipation" control of said motor means, and subsequent movement of the lift plate will stop the motor means.

References Cited in the file of this patent

UNITED STATES PATENTS

| | | |
|---|---|---|
| 1,923,745 | Platzer | Aug. 22, 1933 |
| 2,610,726 | Howard | Sept. 16, 1952 |
| 2,626,042 | Aldridge | Jan. 20, 1953 |
| 2,747,403 | Stevenson | May 29, 1956 |